United States Patent
Morris

(10) Patent No.: US 9,002,596 B2
(45) Date of Patent: Apr. 7, 2015

(54) SELF-ARMING IMMOBILIZER SYSTEM, APPARATUS AND METHOD

(71) Applicant: Hugh Morris, Alma (CA)

(72) Inventor: Hugh Morris, Alma (CA)

(*) Notice: Subject to any disclaimer, the term of this patent is extended or adjusted under 35 U.S.C. 154(b) by 47 days.

(21) Appl. No.: 13/720,611

(22) Filed: Dec. 19, 2012

(65) Prior Publication Data

US 2013/0158822 A1    Jun. 20, 2013

Related U.S. Application Data

(60) Provisional application No. 61/577,511, filed on Dec. 19, 2011.

(51) Int. Cl.
*G01C 17/00* (2006.01)
*G06F 17/00* (2006.01)
*B60R 25/04* (2013.01)

(52) U.S. Cl.
CPC .............. *G06F 17/00* (2013.01); *B60R 25/04* (2013.01); *B60R 2025/0415* (2013.01)

(58) Field of Classification Search
CPC ............. G06F 5/01; G06F 7/02; G06F 7/026; G06F 7/22; G06F 7/06; G06F 7/76; G06F 9/00; G06F 9/06; G06F 9/44; G06F 9/4401; G06F 9/4403; G06F 9/4405; G06F 9/4406
USPC ........... 701/23, 36, 45, 49, 51, 400, 537, 538, 701/539
See application file for complete search history.

(56) References Cited

U.S. PATENT DOCUMENTS

| | | | |
|---|---|---|---|
| 6,380,642 B1 * | 4/2002 | Buchner | 307/10.3 |
| 6,617,707 B1 * | 9/2003 | Reece | 307/10.5 |
| 6,810,309 B2 * | 10/2004 | Sadler et al. | 701/1 |
| 7,019,623 B2 * | 3/2006 | Klausner et al. | 340/425.5 |
| 8,761,998 B2 * | 6/2014 | Chen et al. | 701/36 |

* cited by examiner

*Primary Examiner* — Richard Camby
(74) *Attorney, Agent, or Firm* — Miller Thomson LLP; Tai W. Nahm

(57) ABSTRACT

There is disclosed a self-arming immobilizer system for immobilizing a vehicle. In an embodiment, the system comprises a signal input for receiving a signal indicating the absence of an authorized operator in a position of control in the vehicle; and an immobilizer unit adapted to receive the signal input, and in response to the signal indicating the absence of an authorized operator in a position of control in the vehicle, switch one or more relays to disable one or more circuits in the vehicle to immobilize and secure the vehicle. In an embodiment, the immobilizer unit is adapted to disable a gear shift link solenoid to disable the gear shift. In another embodiment, the immobilizer unit is adapted to disable a gun rack solenoid to lock the gun rack. In another embodiment, the vehicle is immobilized at idle, and the system allows the vehicle to keep idling until deactivated by an authorized operator.

18 Claims, 7 Drawing Sheets

SYSTEM BLOCK DIAGRAM
957 SAIF – Immobilizer for Vehicles with a Push To Start Ignition

SELF-ARMING IMMOBILIZER SYSTEM, APPARATUS AND METHOD

FIELD

The present disclosure relates to a self-arming immobilizer system, apparatus and method for vehicles, and particularly for emergency vehicles such as law enforcement and other first response vehicles which require a high level of security.

BACKGROUND

In the prior art, immobilizer systems for vehicles have typically depended upon some manner of intervention in order to engage and arm a vehicle to prevent unauthorized access or operation. Having to manually engage or arm a vehicle each time an authorized operator leaves a vehicle can become very tedious and lead to lapses in vehicle security. Thus, it is not an uncommon occurrence to have emergency vehicles with immobilization systems that are nevertheless stolen as they are idling or parked due to their immobilization systems remaining disengaged when they should instead be secured under proper security protocols.

What is needed is an improved self-arming immobilizer system, apparatus and method which overcomes at least some of the limitations identified above.

SUMMARY

The present disclosure relates to a self-arming immobilizer system, apparatus and method, particularly for emergency vehicles such as law enforcement and other first response vehicles.

In an aspect, there is provided a self-arming immobilizer system for immobilizing a vehicle. In an embodiment, the system comprises a signal input for receiving a signal indicating the absence of an authorized operator in a position of control in the vehicle; and an immobilizer unit adapted to receive the signal input, and in response to the signal indicating the absence of an authorized operator in a position of control in the vehicle, switch one or more relays to disable one or more circuits in the vehicle to immobilize and secure the vehicle. In another embodiment, the immobilizer unit is adapted to disable a gear shift link solenoid to disable the gear shift. In another embodiment, the immobilizer unit is adapted to disable a gun rack solenoid to lock the gun rack.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

The present disclosure relates to self-arming immobilizer system, apparatus and method for vehicles, particularly for emergency vehicles such as law enforcement and other first response vehicles which require a high level of security.

As explained above, a limitation of prior art immobilizer systems is that they often require manual intervention by an operator in order to arm or engage an immobilizer system. This need to manually engage or arm an immobilizer system often leads to lapses in security, during which articles in the vehicle or the vehicle itself may be unsecured and stolen. For example, law enforcement vehicles may store firearms such as rifles which are normally secured within locked compartments but which may be accessible if an immobilizer system is not engaged.

Frequently, a vehicle may be stolen while idling at which time the vehicle's immobilizer system may have incorrectly assumed that an authorized operator still has control over a vehicle. However, emergency vehicles may be left idling for many reasons including powering onboard systems such as heating, lighting, computers, and mobile communications, and in order to allow for a minimum of delay in engaging the emergency vehicle into motion in situations requiring a rapid response to a developing event.

In order to overcome at least some of these limitations in the prior art, the inventor has developed an improved apparatus and method for immobilizing a vehicle in which the immobilization system is automatically armed virtually the same instant that an authorized operator leaves a position of control of the vehicle, and is released only in the presence of an electronic device or security key fob in combination with a manual intervention by the operator. By automatically engaging the immobilization system almost immediately (e.g. within one second) as an operator leaves a vehicle, the risk that the vehicle could be stolen due to non-engagement of the immobilization system is virtually eliminated.

At the same time, within the presence of an electronic device or security key fob for disarming a vehicle which transmits a valid code when an operator is in proper position to operate the vehicle, the present system and method can be adapted to allow the operator to almost instantly disarm the immobilization system and quickly shift the vehicle into gear and engage the emergency vehicle into motion.

Illustrative embodiments of the system and method will now be described in more detail with reference to the figures.

Figure 1:
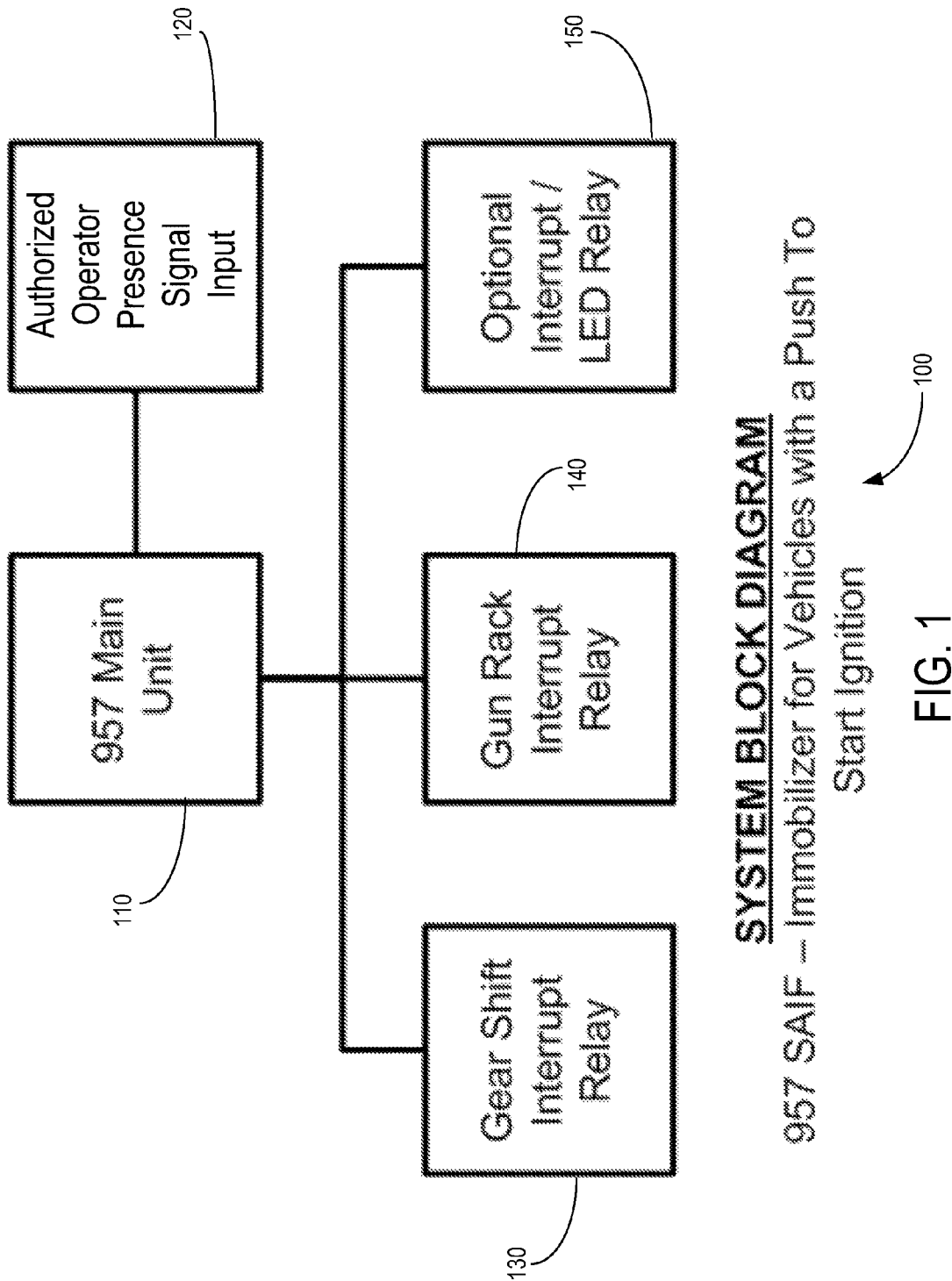
FIG. 1 shows a schematic block diagram of an illustrative immobilizer system in accordance with an embodiment.

Referring to FIG. 1, shown is a schematic block diagram of an illustrative immobilizer system 100 in accordance with an embodiment. As shown, system 100 includes a main immobilizer unit 110 operatively connected to a signal input 120 which indicates the presence or absence of an authorized operator in a position of control in the vehicle.

As an illustrative example, the signal input 120 may be a door open signal received from the driver's side door while a vehicle is idling, or if the vehicle ignition has recently been turned off. For example, the main immobilizer unit 110 may arm the immobilizer system via a door input ground, or a positive 12V via relay no. 1 (described further below) by interrupting ignition to the immobilizer and initiating a short time out of one second, for example.

The main immobilizer unit recognizes the receipt of this signal as an indication that the authorized operator is leaving a position of control of the vehicle (i.e. the drivers seat) by opening the driver's side door.

In another embodiment, instead of or in addition to a door open signal, the signal input 120 may also be a signal from a sensor which detects that the authorized operator has left a position of control of the vehicle. For example, a driver's seat weight sensor may be used to detect the presence of the authorized operator in the driver's seat.

In another embodiment, the proximity of an electronic device or security key fob may be used by the main immobilizer unit 110 to determine whether the authorized operator is still in a position of control in the vehicle. This signal may be used on its own, or in conjunction with the door open signal. If so, the main immobilizer unit may leave the immobilizer system disengaged even when the driver's side door is opened for a lengthy period of time. However, as soon as the absence of the authorized driver's position is defected (e.g. a driver's seat weight sensor no longer detects the presence of the authorized operator and/or the main immobilizer unit 110 no longer detects the proximity of the electronic device or security key fob), the main immobilizer unit may immediately engage the immobilizer system to prevent operation of the vehicle.

In another embodiment, a combination of one or more of a door open signal and an additional sensor.

In an embodiment, in addition to determining the presence or absence of an operator in the driver's seat, various other biometric security measures may be implemented by the main immobilizer unit 110 to positively identify one or more authorized operators. Thus, for example, in addition to detecting the presence of an electronic device or security key fob, the system may further include a fingerprint sensor which confirms the identity of one or more authorized operators by having an operator position or swipe one of their fingers on or across the fingerprint sensor before engaging. Alternatively, the system may receive voice samples of authorized operators to confirm that there is a voice match to confirm an authorized operator. This would require that the fingerprints and/or voice samples of the multiple operators be stored in the system.

Still referring to FIG. 1, as shown, main immobilizer unit 110 is operatively connected to a gearshift interrupt relay 130, a gun rack interrupt relay 140, and an optional interrupt/LED relay 150. By controlling an interrupt switch for a gearshift interrupt relay 130, main immobilizer unit 110 can effectively disable motion of a vehicle by preventing any gearshifts. Similarly, main immobilizer unit 110 disables the gun rack interrupt relay 140 to prevent unauthorized access to firearms when the immobilizer system is automatically engaged.

Figure 2:
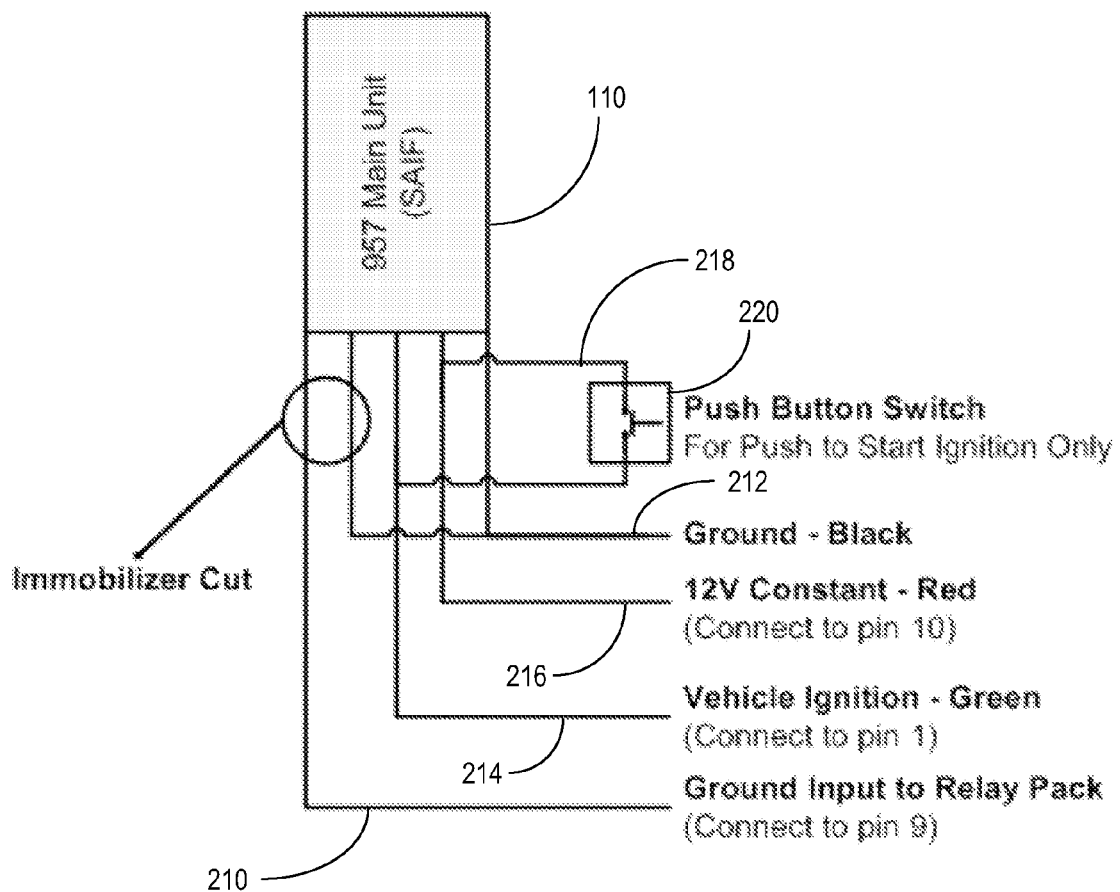
FIG. 2 shows a schematic block diagram of an illustrative self-arming immobilizer unit in accordance with an embodiment.

Now referring to FIG. 2, shown is a schematic block diagram of an illustrative self-arming immobilizer unit 200 in accordance with an embodiment. As shown, self-arming immobilizer unit 200 includes a number of connection points 210-218 including a ground input to relay pack 210, ground 212, vehicle ignition 214, a 12 V constant 216, and connection 218 to a push button switch 220.

In an embodiment, connection point 210 is a wire carrying an arm/disarm signal from the self-arming immobilizer unit 200. When the immobilizer is disarmed, connection point 210 is connected to the coils on a relay pack and is activated to close the contacts and allow the interrupted circuits to function.

Connection point 212 is the ground input, and connection point 214 is the ignition sense wire that, when interrupted, initiates a timed rearm period. While the vehicle is idling, this ignition sense wire holds 12V, and when not idling, it rests at negative ground. Connection point 216 is the 12V constant input. Finally, connection point 218 provides a constant 12V input source, and when connected via a push button switch for ignition, it simulates a key on/off procedure to allow programming of additional FOBS.

Figure 3:
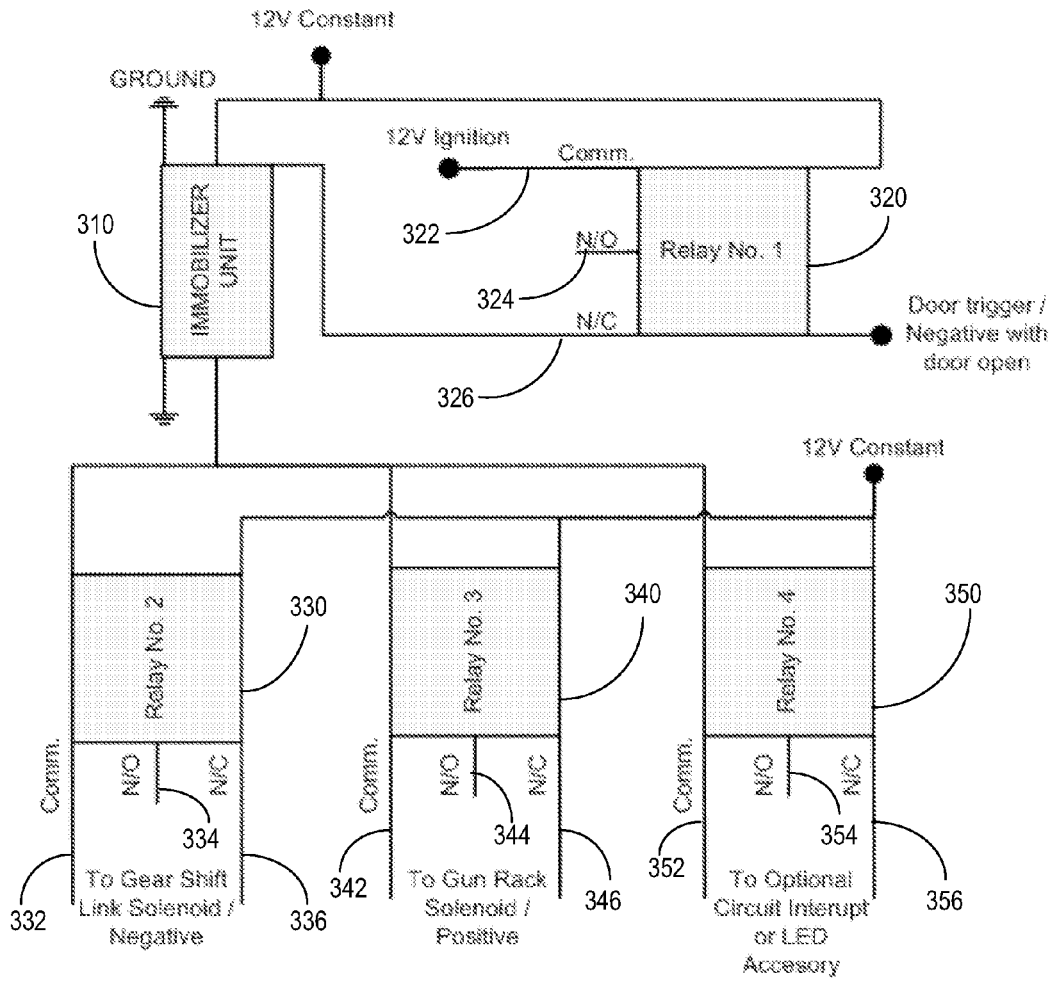
FIG. 3 shows an illustrative schematic wiring diagram for the illustrative self-arming immobilizer unit in accordance with an embodiment.

Now referring to FIG. 3, shown is an illustrative schematic wiring diagram 300 for the illustrative self-arming immobilizer unit 200 of FIG. 2 in accordance with an embodiment. As shown, FIG. 3 includes an immobilizer unit 310 operatively connected to relay no. 1 (320), relay no. 2 (330), relay no. 3 (340) and relay no. 4 (350).

In an embodiment, relay no. 1 (320) is connected by a number of connection points including a 12V constant, Common 322, normally open (N/O) contact 324, and normally closed (N/C) contact 326. Similarly, relay no. 2 (330) is connected to a 12V constant, and to connection points Common 332, N/O 334, and N/C 336; relay no. 3 (340) is connected to a 12V constant, and to connection points Common 342, N/O 344, and N/C 346; and relay no. 4 (350) is connected to a 12V constant, and connection points Common 352, N/O 354, and N/C 356.

For all relays 1 to 5, the 12V constant energizes a coil. The N/C contact and the N/O provide first and second contacts for first and second contact states. The Common provides a connection between the N/O and N/C contacts.

In an embodiment, when a coil is energized, the contacts change state from N/C to N/O. The Common contact switches and actives the N/O contact and opens the N/C contact. For each relay this operation is the same, and when the immobilizer system is armed, the armed output from the immobilizer opens the contacts for the interrupted circuits, i.e. the switched open immobilized circuits will not function.

In operation, self-arming immobilizer unit 200 receives inputs from one or more input signals as described earlier, and determines which vehicle functions to disable in dependence upon whether or not an authorized operator is in control of the vehicle.

As described above, self-arming immobilizer unit 200 is adapted to disable one or more vehicle functions or features by switching a relay and opening a circuit rendering it non-functional. However, if a valid code is received from an electronic device or security key fob transmitting a disarming code, the ignition is switched back on and the immobilizer is once again cleared and the relay is closed make the circuit functional once again.

In an embodiment, when a vehicle's ignition is switched off, the self-arming immobilizer unit 200 will automatically self-arm the vehicle. As described above, the immobilizer system is armed almost immediately upon detecting that an authorized operator is no longer in a control position (i.e. the driver's seat). Preferably, the immobilizer system is armed within one second of ignition off, or within one second of receiving one or more signals indicating that the authorized operator has left his control position. This short time delay is designed to immediately arm the vehicle to stop unauthorized access to contents and to prevent unauthorized operation of the vehicle.

In an embodiment, self-arming immobilizer unit 200 may be adapted to protect an emergency vehicle and its contents from theft while the vehicle is left idling, and the driver is absent from the vehicle. In this case, the system and method automatically engages the immobilization system as the authorized operator leaves his or her position of control of the vehicle. However, as the system must detect the electronic device or security key fob, and the user also needs to take a positive step to disarm the immobilization system once armed, the security of the vehicle is greatly increased.

In this embodiment, the present immobilizer system does not interrupt the vehicles starter, ignition or fuel pump such that the vehicle can remain idling. Rather, the present immobilizer system can interrupt the vehicle's gear shift mechanism and any other additional electronic locking devices, leaving the vehicle still protected in an idling state.

In an embodiment, the immobilizer unit 200 has a capacity to work with a number of "User" transmitters and one or more "Administrator" transmitters to allow the immobilizer system to be disarmed. One or more electronic devices or secure keys which transmit a disarming code may be programmed prior to the immobilizer unit 200 leaving the factory. Other electronic devices or secure keys may be programmed in the field as required.

In operation, User fobs are primarily for the daily operation of the vehicle, whereas the Administrator fobs are Master fobs for key personnel requiring access to all vehicles for vehicle maintenance and fleet management. The Administrator/Master fobs may be used to disarm any protected vehicle within a fleet, and also to authorize new User fobs for the vehicle. The Administrator/Master fobs are therefore necessary for backend fleet management.

In an embodiment, a first Administrator transmitter used within the presence of the immobilizer unit 200 is programmed info the unit, and the unit will then be in Administrator mode. In Administrator mode the immobilizer unit will disarm from a disarm code received from the Administrator transmitter. If there are user transmitters in the memory, it will also respond to those.

Once a vehicle is sold to enter emergency service, the change from Administrator mode to User mode and learning in transmitters may be accomplished by following a predetermined sequence of procedures that have a sufficient number of steps such that they are unlikely to be known or guessed by any unauthorized operator.

Figure 4:
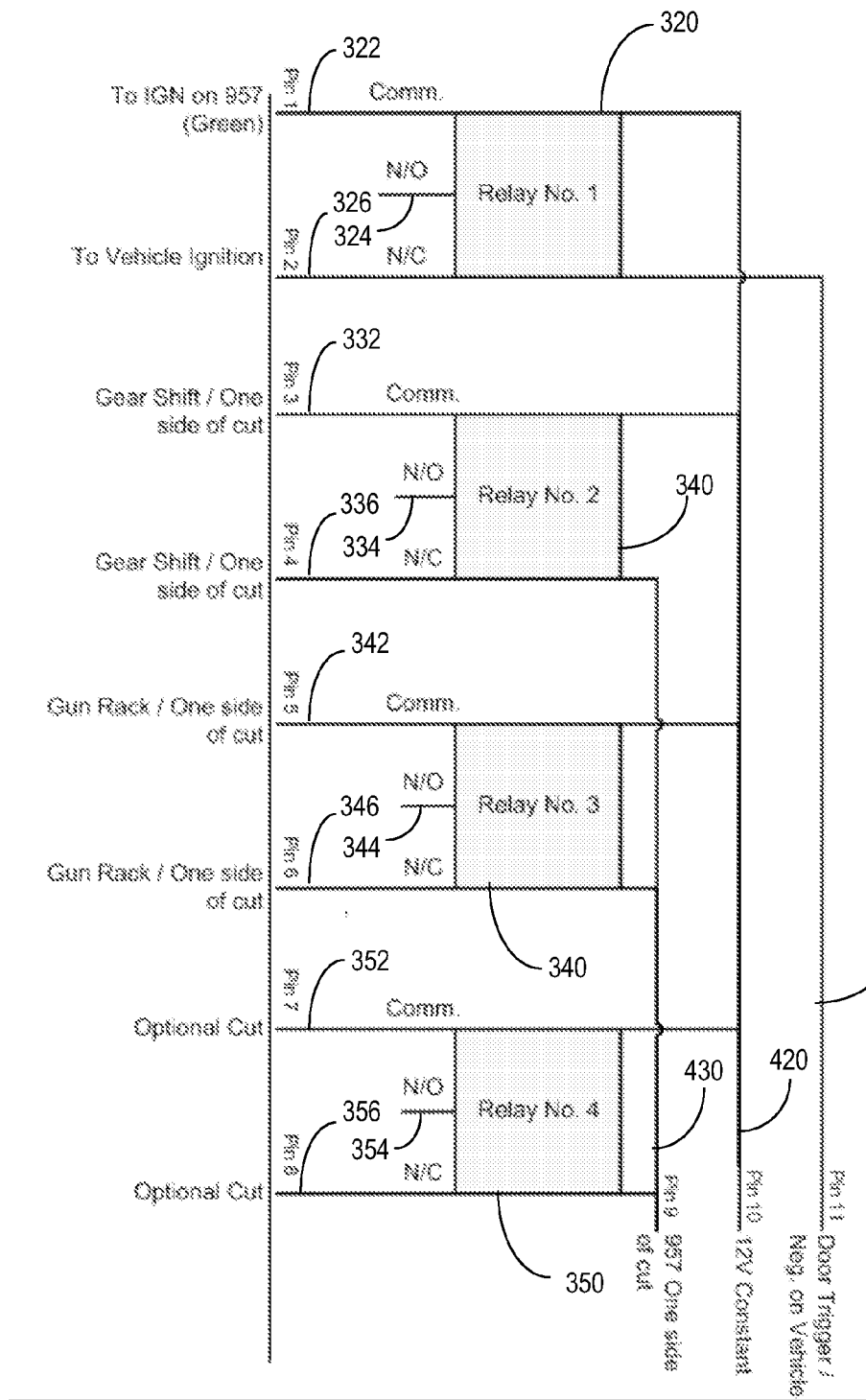
FIG. 4 shows a schematic relay wiring diagram for the illustrative self-arming immobilizer unit in accordance with an embodiment.

Now referring to FIG. 4, shown is a schematic relay wiring diagram 400 for the illustrative self-arming immobilizer unit 200 as described above. As shown, relay no. 1 (320) is operatively connected to the IGN on main immobilizer unit 110, and also to the vehicle ignition.

Relay no. 2 (330) is operatively connected to a gear shift link solenoid circuit and adapted to interrupt the gear shift link solenoid circuit by cutting a negative input wire via relay no. 2.

Relay no. 3 (340) is operatively connected to a gun rack lock solenoid circuit which may be interrupted by cutting a 12V positive or negative input wire via relay no. 3.

Relay no. 4 (350) is adapted to operatively connect to one or more other circuits to allow for other on board circuit interruption if and when required, or to drive an LED. For example, relay no. 4 may be connected to an onboard camera housing to lock out access to the camera and video recording. Various other on board items may be secured as well such as an on board computer, or other on board device requiring security from an unauthorized operator.

Figure 5:
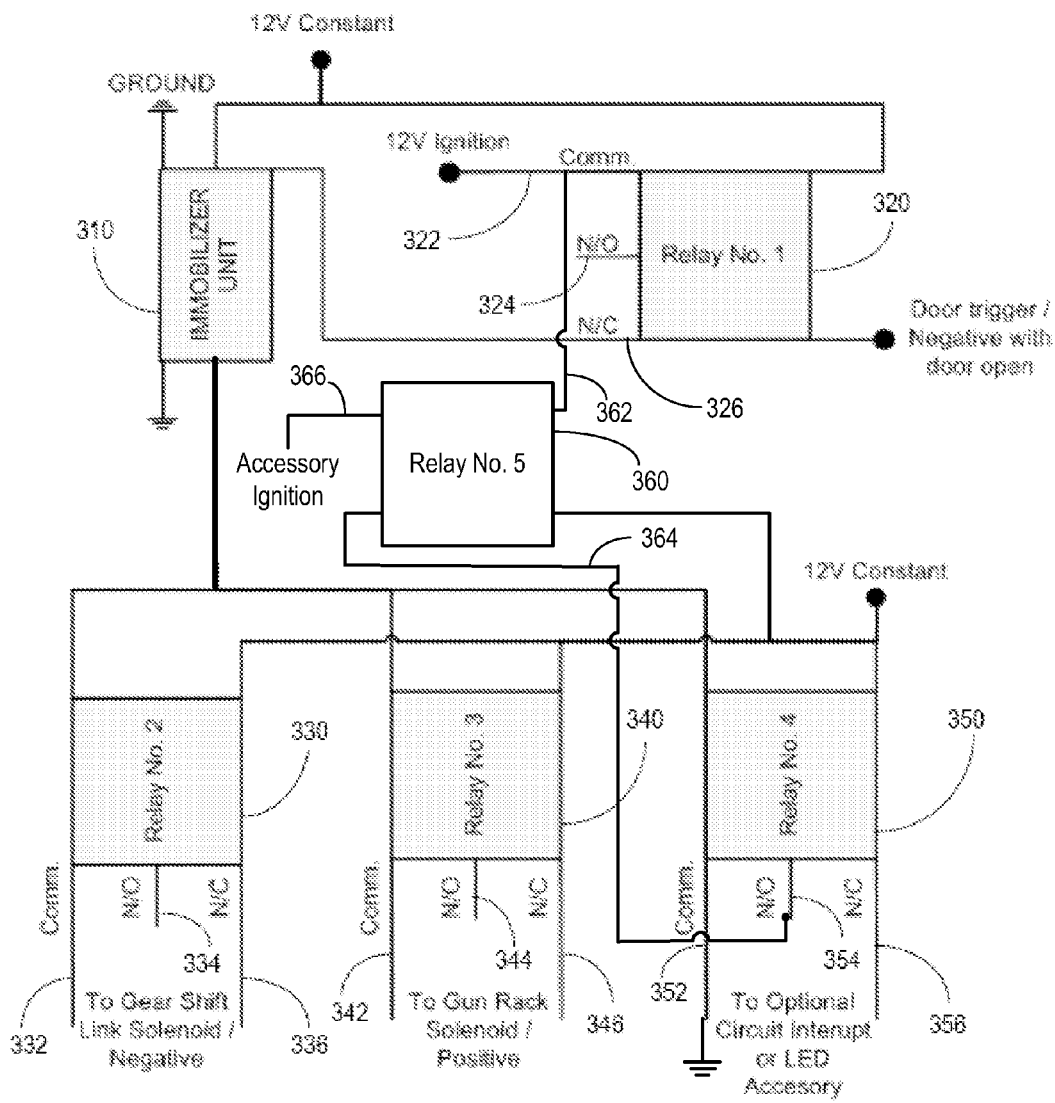
FIG. 5 shows an illustrative schematic wiring diagram for another embodiment of the self-arming immobilizer unit.

Now referring to FIG. 5, shown is an illustrative schematic wiring diagram for another embodiment of the self-arming immobilizer unit. It will be noted that the illustrative circuit in FIG. 5 is substantially the same as FIG. 3 except that relay no. 5 (360) has now been added, and Common (352) is now connected to ground. The ground input, now an input from relay no. 5 when in an armed state, allows activation to relay no. 5.

In an embodiment, relay no. 5 (360) may include a contact 360 to the N/O (354) of relay no. 4, and another contact (362) to the Common (322) of relay no. 1 (320). Relay no. 5 (360) is also connected to the accessory ignition 366 of a vehicle requiring an ignition in the steering wheel column or dashboard requiring the presence of a physical key. Relay no. 5 allows an operating mode in which the immobilizer system may allow the vehicle to continue running in idle with critical vehicle functions operating, but with the physical key actually removed from the ignition. This feature allows the vehicle to be idle when removing the physical key and by removing the security key fob which may be also hanging on the key chain.

Relay no. 5 relies on a ground signal from relay no. 4 in the armed state to activate and hold the ignition power source when a keyed vehicle's key is turned off and removed from the vehicle to allow continuous idling without the key in position. The 12V input for relay no. 5 is connected to the accessory ignition that drops out, loses 12V in the crank process to avoid an over-crank/anti-grind on the starter motor.

In another embodiment, the immobilizer unit is able to function in two different ways: (1) With an aftermarket encrypted fob to disarm the device (relying on the aftermarket fob random encryption and requiring the operator to use two fobs); or (2) With the OEM factory fob. (This is done by the OEM unlock output used to deactivate the devices relay pack after the aftermarket immobilizer unit, relying on the factory fobs encryption for security.) This will allow the operator to use only the OEM fob.

In operation, the after market fob option only disarms the idle protection device. It does not allow the vehicle to start. Hence requiring the operator to have the OEM fob on his person and in the vehicle to start and drive the vehicle. When the device is activated and disarmed the operator does not have to use the OEM fob. If the doors are locked he will need to unlock with the OEM fob. This is the most secure method, as it forces the operator to use two fobs to drive the vehicle.

The second option using an OEM fob only disarms the idle protection device and also disarms the vehicles security to allow it to start. This option does offer the convenience of passive entry and disarm at the same time. That is, the vehicle has a passive entry option selected on the vehicle option panel, if selected by the operator, and the idle protection device is armed, when the operator reaches for the door handle it senses the OEM fob on his person and immediately unlocks and disarms the idle protection system, allowing him to drive the vehicle. An illustrative implementation is now described.

Figure 6:
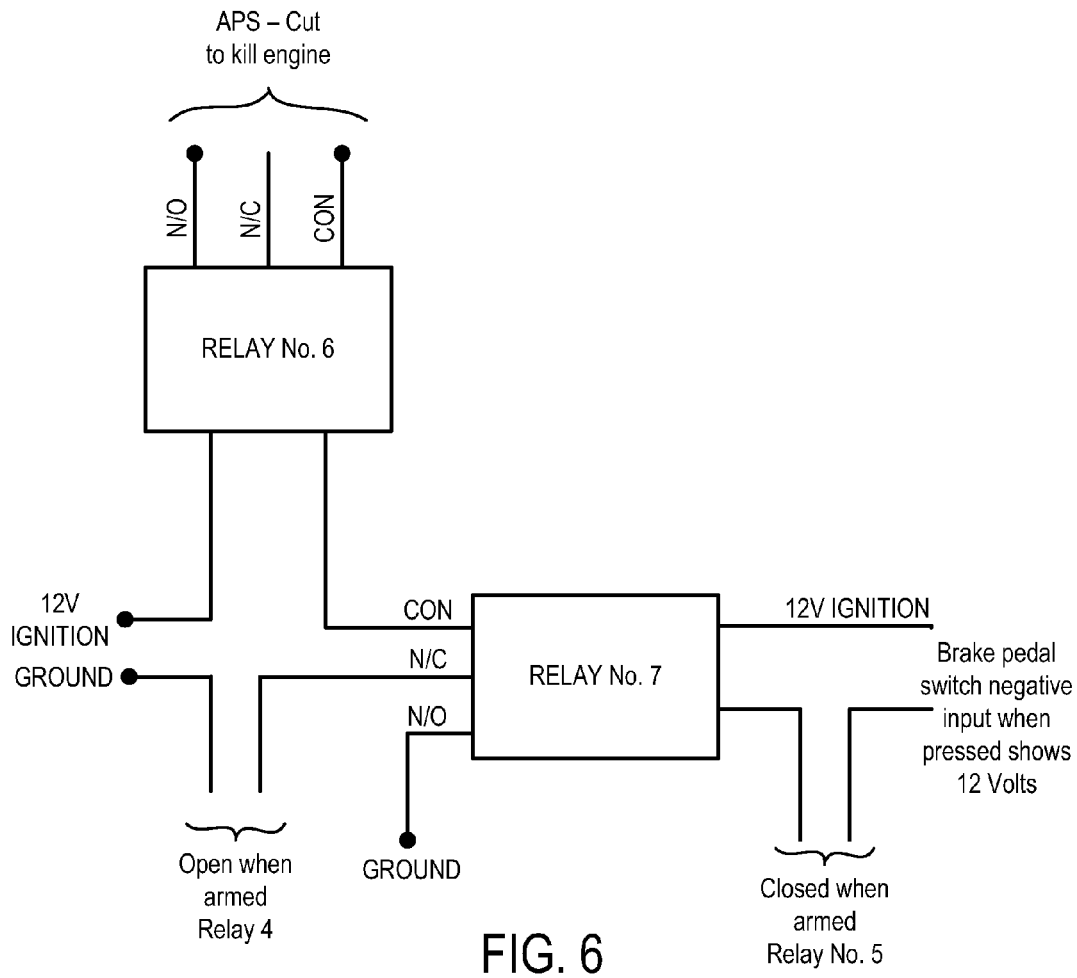
FIG. 6 shows an illustrative schematic wiring diagram of a portion of the self-arming immobilizer unit in accordance with an embodiment.

Referring to FIG. 6, shown is an illustrative schematic wiring diagram of a portion of the self-arming immobilizer unit in accordance with an embodiment. As shown, relay no. 6 (601) is connected by a number of connection points including an N/O 602, N/C 604 and contact 606. Relay no. 6 is further connected to 12V ignition 608 and to contact 610 of relay no. 7 (701). Relay no. 7 in turn is connected to N/C 612, N/O 614. N/C 612 and connector 613 are connected to relay no. 5 (not shown) and are open when the system is armed.

Relay no. 7 is connected to 12V ignition 616, and to relay no. 5 via connection 618 which is closed when the system is armed. When connection 618 is closed, a brake pedal switch negative input results in a signal to shut down the engine. This feature is adapted to shut down the vehicle in the event of an unauthorized diver entering the vehicle and presses the brake to engage the gear shift into drive. This is a second preventative feature as the gear shift link is already disabled.

Figure 7:
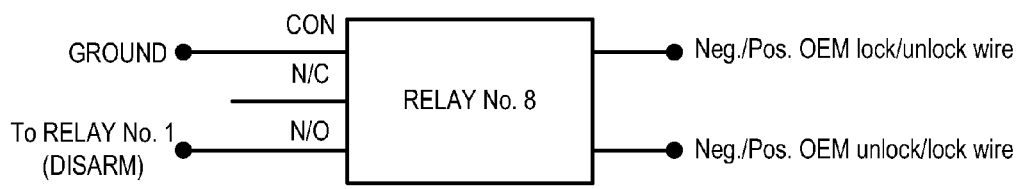
FIG. 7 shows an illustrative schematic wiring diagram of a portion of the self-arming immobilizer unit in accordance with another embodiment.

Now referring to FIG. 7, shown is an illustrative schematic wiring diagram of a portion of the self-arming immobilizer unit in accordance with another embodiment. More particularly, this configuration activates a DISARM signal with an OEM fob. As shown, relay no. 8 (801) is connected to ground by connection 702, N/C 704, and N/O 706. N/O 706 is connected to relay no. 1 (DISARM). Furthermore, relay no. 8 is connected to a negative/positive OEM lock/unlock wire 708, and to a negative/positive OEM unlock/lock wire 710. In the case of using the OEM fob to disarm the device. The relay pack receives a disarm signal from the lock/unlock pulse activated by the encrypted OEM fob via the keyless entry module.

Figure 8:
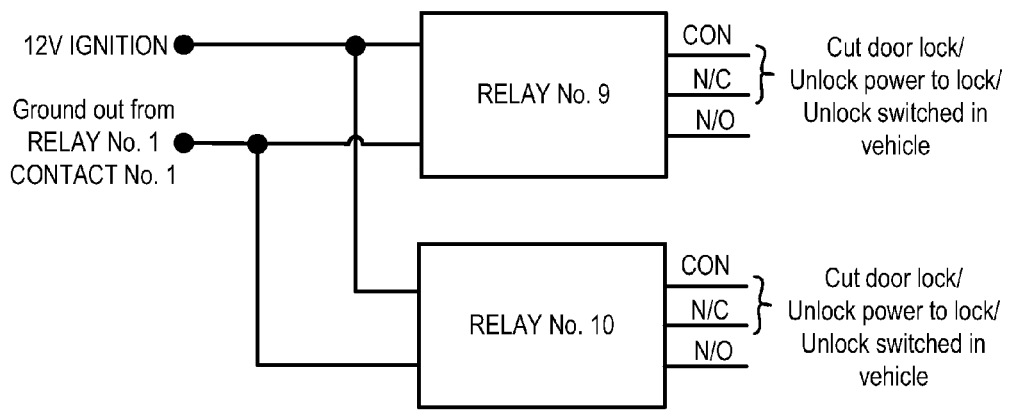
FIG. 8 shows an illustrative schematic wiring diagram of a portion of the self-arming immobilizer unit in accordance with another embodiment.

Now referring to FIG. 8, shown is an illustrative schematic wiring diagram of a portion of the self-arming immobilizer unit in accordance with another embodiment. More specifically, this configuration prevents disarming of the Unit by the internal lock/unlock switches in the vehicle. Once the immobilizer unit is disarmed with the OEM fob, the internal switches work as normal. As shown, relay no. 9 (901) and relay no. 10 (1001) are each connected to 12V ignition via shared connection 802, and to a ground out from relay no. 1, contact no. 1 (not shown) via shared connection 804. Each of relay no. 9 and relay no. 10 are also connected via contacts 806, 812, N/C's 808, 814, and N/O's 810, 816.

Figure 9:
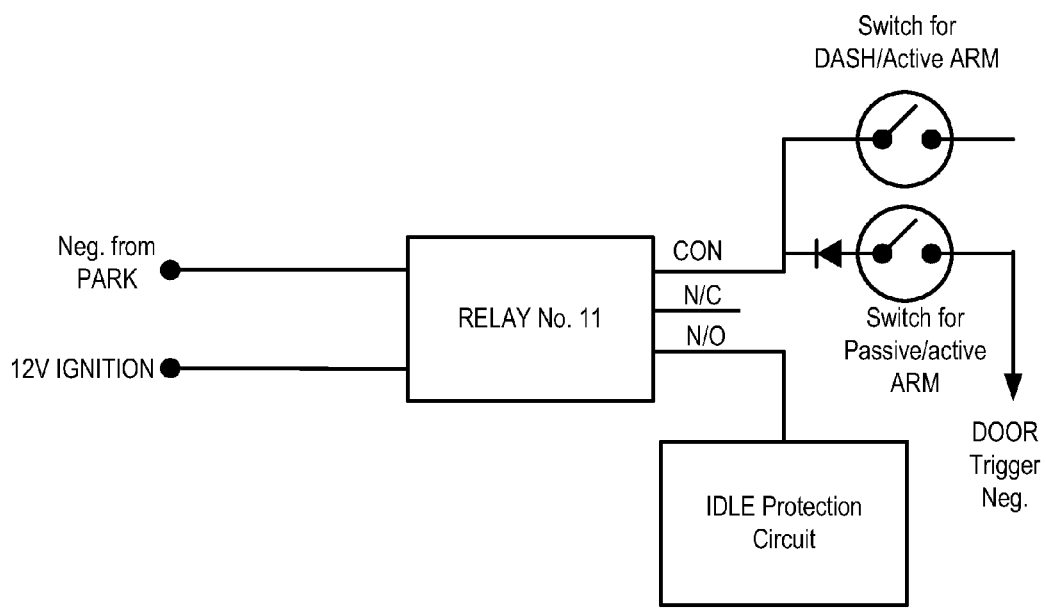
FIG. 9 an illustrative schematic wiring diagram of a portion of the self-arming immobilizer unit in accordance with yet another embodiment.

Now referring to FIG. 9, shown is an illustrative schematic wiring diagram of a portion of the self-arming immobilizer unit in accordance with yet another embodiment. More particularly, this configuration ensures that the vehicle is in PARK before the unit can be armed. As shown, relay no. 11 (1101) is connected to negative from PARK 902, 12V Ignition 904, contact 906, M/C 908, and N/O 910. Contact 906 is connected to switch 912 which switches the mode of operation of the unit between a dash mounted manual active ARM button, Contact 906 is also connected to switch 914 which switches the mode of operation of the unit to passive and active arming based on the door trigger. FIG. 9 details the change in operation from Active to passive arming via switch 914. This offers operators an easy change from Active to passive arming by the flick of the switch.

In an embodiment, the OEM fob and the aftermarket fob may be adapted to use separate relay configurations to activate and deactivate the system. For example, a door open or push button input may be used as an ignition disconnect for a one second period time out period on the immobilizer to arm the device, placing it into an armed state, and the aftermarket fob may be configured to only disarm the system.

In another embodiment, the OEM fob may be adapted to use a change of state relay (e.g. a latching relay) to disarm the device. In this case the relay state is changed by the door input or push button placing the device into an armed state. The OEM unlock button when pressed activates an input to change the state back into the disarmed state.

In an embodiment, when using two fobs to disarm the system for additional security, the OEM fob must first be used to disarm the device before the aftermarket fob will disarm the immobilizer. The latching relay (not shown) is easily incorporated for two fob functionality. The system may function with either or as specified by the customer.

Advantageously, by allowing a vehicle to continue to idle while the physical key and any security fob is removed from the vehicle, the immobilizer system and method significantly reduces the likelihood of a vehicle being stolen while running in idle.

Thus, in an aspect, there is provided a self-arming immobilizer system for immobilizing a vehicle, comprising: a signal input for receiving a signal indicating the absence of an authorized operator in a position of control in the vehicle; and an immobilizer unit adapted to receive the signal input, and in response to the signal indicating the absence of an authorized operator in a position of control in the vehicle, switch one or more relays to disable one or more circuits In the vehicle to immobilize and secure the vehicle.

In an embodiment, the self-arming immobilizer system of claim 1, wherein the signal indicating the absence of an authorized operator is provided by a door open trigger.

In another embodiment, the self-arming immobilizer system of claim 1, wherein the signal indicating the absence of an authorized operator is provided by the absence of a key ignition fob.

In another embodiment, the signal indicating the absence of an authorized operator is provided via a manual arming switch located on a dash of the vehicle.

In another embodiment, the signal indicating the absence of an authorized operator is provided by an active arming signal generated from a first fob.

In another embodiment, a signal required to re-enable one or more circuits in the vehicle is provided by a second fob.

In another embodiment, the signal indicating the absence of an authorized operator can only be generated when the vehicle is in a parked mode.

In another embodiment, a signal required to re-enable one or more circuits in the vehicle using a first fob is not operational in the absence of a second fob.

In another embodiment, the immobilizer unit is adapted to disable a gear shift link solenoid to disable the gear shift.

In another embodiment, the immobilizer unit is adapted to disable a gun rack solenoid to lock a gun rack.

In another embodiment, the immobilizer unit is adapted to immobilize the vehicle at idle.

In another aspect, there is provided a method of immobilizing a vehicle, comprising: receiving a signal at a signal input for indicating the absence of an authorized operator in a position of control in the vehicle; and in response to the signal indicating the absence of an authorized operator in a position of control in the vehicle, switch one or more relays to disable one or more circuits in the vehicle to immobilize and secure the vehicle utilizing an immobilizer unit adapted to disable the one or more circuits.

In an embodiment, the method further comprises providing the signal indicating the absence of an authorized operator utilizing a door open trigger.

In another embodiment, the method further comprises providing the signal indicating the absence of an authorized operator utilizing the absence of a key ignition fob.

In another embodiment, the method further comprises providing the signal indicating the absence of an authorized operator utilizing a manual arming switch located on a dash of the vehicle.

In another embodiment, the method further comprises providing the signal indicating the absence of an authorized operator utilizing an active arming signal generated from a first fob.

In another embodiment, the method further comprises providing a signal required to re-enable one or more circuits in the vehicle utilizing a second fob.

In another embodiment, the method further comprises generating the signal indicating the absence of an authorized operator can only when the vehicle is in a parked mode.

In another embodiment, the method further comprises providing a signal required to re-enable one or more circuits in the vehicle using a first fob is not operational in the absence of a second fob.

In another embodiment, the method further comprises disabling a gear shift link solenoid to disable the gear shift.

In another embodiment, the method further comprises disabling a gun rack solenoid to lock a gun rack.

In another embodiment, the method further comprises immobilizing the vehicle at idle and allowing the vehicle to continue to idle after immobilization.

While the above description provides examples of one or more embodiments of the invention, it will be appreciated that numerous other embodiments may be within the scope of the present invention, as defined by the following claims.

The invention claimed is:

1. A self-arming immobilizer system for immobilizing a vehicle, comprising: a signal input for receiving a signal indicating the absence of an authorized operator in a position of control in the vehicle; and an immobilizer unit adapted to receive the signal input, and in response to the signal indicating the absence of an authorized operator in a position of control in the vehicle, switch one or more relays to disable one or more circuits in the vehicle to immobilize and secure the vehicle, wherein a re-enabling signal required to re-enable one or more circuits in the vehicle using a first fob is not operational in the absence of a second fob.

2. The self-arming immobilizer system of claim 1, wherein the signal indicating the absence of an authorized operator is provided by a door open trigger.

3. The self-arming immobilizer system of claim 1, wherein the signal indicating the absence of an authorized operator is provided by the absence of a key ignition fob.

4. The self-arming immobilizer system of claim 1, wherein the signal indicating the absence of an authorized operator is provided via a manual arming switch located on a dash of the vehicle.

5. The self-arming immobilizer system of claim 1, wherein the signal indicating the absence of an authorized operator is provided by an active arming signal generated from a first fob.

6. The self-arming immobilizer system of claim 1, wherein the re-enabling signal required to re-enable one or more circuits in the vehicle is provided by the second fob.

7. The self-arming immobilizer system of claim 1, wherein the signal indicating the absence of an authorized operator can only be generated when the vehicle is in a parked mode.

8. The system of claim 1, wherein the immobilizer unit is adapted to disable a gear shift link solenoid to disable the gear shift.

9. The system of claim 8, wherein the immobilizer unit is adapted to immobilize the vehicle at idle.

10. A method of immobilizing a vehicle, comprising: receiving a signal at a signal input for indicating the absence of an authorized operator in a position of control in the vehicle; in response to the signal indicating the absence of an authorized operator in a position of control in the vehicle, switch one or more relays to disable one or more circuits in the vehicle to immobilize and secure the vehicle utilizing an immobilizer unit adapted to disable the one or mere circuits; and disabling operation of a re-enabling signal required to re-enable one or more circuits in the vehicle using a first fob in the absence of a second fob.

11. The method of claim 10, further comprising providing the signal indicating the absence of an authorized operator utilizing a door open trigger.

12. The method of claim 10, further comprising providing the signal indicating the absence of an authorized operator utilizing the absence of a key ignition fob.

13. The method of claim 10, further comprising providing the signal indicating the absence of an authorized operator utilizing a manual arming switch located on a dash of the vehicle.

14. The method of claim 10, further comprising providing the signal indicating the absence of an authorized operator utilizing an active arming signal generated from a first fob.

15. The method of claim 10, further comprising providing the re-enabling signal required to re-enable one or more circuits in the vehicle utilizing the second fob.

16. The method of claim 10, further comprising generating the signal indicating the absence of an authorized operator only when the vehicle is in a parked mode.

17. The method of claim 10, further comprising disabling a gear shift link solenoid to disable the gear shift.

18. The method of claim 17, further comprising immobilizing the vehicle at idle and allowing the vehicle to continue to idle after immobilization.

* * * * *